US009778663B2

United States Patent
Zou et al.

(10) Patent No.: US 9,778,663 B2
(45) Date of Patent: Oct. 3, 2017

(54) METHOD FOR OPTIMIZING FLIGHT SPEED OF REMOTELY-SENSED SCAN IMAGING PLATFORM

(71) Applicant: JIANGSU UNIVERSITY, Jiangsu (CN)

(72) Inventors: Xiaobo Zou, Jiangsu (CN); Jiyong Shi, Jiangsu (CN); Jiewen Zhao, Jiangsu (CN); Xiaowei Huang, Jiangsu (CN); Yaodi Zhu, Jiangsu (CN); Zhihua Li, Jiangsu (CN)

(73) Assignee: JIANGSU UNIVERSITY (CN)

( * ) Notice: Subject to any disclaimer, the term of this patent is extended or adjusted under 35 U.S.C. 154(b) by 0 days.

(21) Appl. No.: 15/037,646

(22) PCT Filed: Jun. 25, 2014

(86) PCT No.: PCT/CN2014/000623
§ 371 (c)(1),
(2) Date: May 18, 2016

(87) PCT Pub. No.: WO2015/089896
PCT Pub. Date: Jun. 25, 2015

(65) Prior Publication Data
US 2016/0299513 A1 Oct. 13, 2016

(30) Foreign Application Priority Data
Dec. 20, 2013 (CN) .......................... 2013 1 0715095

(51) Int. Cl.
*G01C 11/02* (2006.01)
*G05D 13/02* (2006.01)
(Continued)

(52) U.S. Cl.
CPC .............. *G05D 13/02* (2013.01); *G01C 11/02* (2013.01); *G05D 13/62* (2013.01); *G06T 5/006* (2013.01);
(Continued)

(58) Field of Classification Search
CPC ..................................................... G01C 11/02
See application file for complete search history.

(56) References Cited

U.S. PATENT DOCUMENTS 3,412,375 A * 11/1968 Prehmus ................... G01S 1/02
342/410
3,419,329 A * 12/1968 Vogeley ................... B64G 1/24
356/150
(Continued)

FOREIGN PATENT DOCUMENTS

CN 102004250 4/2011 ............ G01S 13/90
CN 102298070 12/2011
(Continued)

OTHER PUBLICATIONS

International Search Report issued in application No. PCT/CN2014/000623, dated Sep. 29, 2014 (8 pgs).
(Continued)

*Primary Examiner* — Truc M Do
(74) *Attorney, Agent, or Firm* — Hayes Soloway P.C.

(57) ABSTRACT

A method for optimizing a flight speed of a remotely-sensed scan imaging platform. The method comprises: selecting a reference point; obtaining a remotely-sensed scan image in a reference point region, and processing data; and optimizing a flight speed of a remotely-sensed scan platform. By optimizing a movement speed of a remotely-sensed movement platform, the method can prevent a geometric dimension of a target in a remotely-sensed scan image from being distorted, so as to obtain a high-precision remotely-sensed (Continued)

image of a ground target; and the method can be used for airborne and satellite borne remotely-sensed images.

3 Claims, 2 Drawing Sheets

(51) Int. Cl.
  *G05D 13/62* (2006.01)
  *G06T 5/00* (2006.01)
  *G06T 7/246* (2017.01)
(52) U.S. Cl.
  CPC .... *G06T 7/246* (2017.01); *G06T 2207/10032* (2013.01); *G06T 2207/30188* (2013.01); *G06T 2207/30241* (2013.01)

(56) References Cited

U.S. PATENT DOCUMENTS

| | | | | |
|---|---|---|---|---|
| 3,525,568 | A * | 8/1970 | Dreyfus | B64D 43/00 356/28 |
| 5,475,393 | A * | 12/1995 | Heinzerling | G01S 1/14 342/410 |
| 5,825,021 | A * | 10/1998 | Uemura | G01S 17/026 250/222.1 |
| 6,239,745 | B1 * | 5/2001 | Stratton | G01S 19/15 244/183 |
| 8,675,068 | B2 * | 3/2014 | Nixon | B64D 47/08 348/117 |
| 9,052,571 | B1 * | 6/2015 | Lapstun | G03B 15/006 |
| 9,185,290 | B1 * | 11/2015 | Lapstun | H04N 5/23238 |
| 9,654,706 | B2 * | 5/2017 | Qin | H04N 5/357 |
| 9,723,269 | B2 * | 8/2017 | Giuffrida | H04N 7/18 |
| 2003/0027655 | A1 * | 2/2003 | Lutz | A63B 43/06 473/198 |
| 2005/0157946 | A1 * | 7/2005 | Sheu | G06K 9/3216 382/294 |
| 2007/0188610 | A1 * | 8/2007 | Micotto | G01C 11/025 348/144 |
| 2007/0242135 | A1 * | 10/2007 | Rosenblum | G01C 11/02 348/144 |
| 2008/0050012 | A1 * | 2/2008 | Oyama | G06K 9/0063 382/154 |
| 2010/0013927 | A1 * | 1/2010 | Nixon | G01C 11/06 348/144 |
| 2010/0286852 | A1 * | 11/2010 | Bouquet | G01C 21/005 701/17 |
| 2010/0295855 | A1 * | 11/2010 | Sasakawa | G06T 3/0031 345/427 |
| 2011/0101239 | A1 | 5/2011 | Woodhouse et al. | 250/458.1 |
| 2011/0311099 | A1 | 12/2011 | Derbanne | 382/103 |
| 2012/0062730 | A1 * | 3/2012 | Ferrano | G01C 11/02 348/135 |
| 2012/0120069 | A1 * | 5/2012 | Kodaira | G06F 17/30271 345/419 |
| 2012/0200703 | A1 * | 8/2012 | Nadir | G02B 27/644 348/144 |
| 2012/0288170 | A1 * | 11/2012 | McVey | G06K 9/52 382/128 |
| 2012/0320203 | A1 * | 12/2012 | Liu | G01C 11/04 348/144 |
| 2013/0135440 | A1 * | 5/2013 | Ohtomo | H04N 13/02 348/46 |
| 2014/0049769 | A1 * | 2/2014 | Zheleznyak | G01S 17/89 356/28 |
| 2014/0198211 | A1 * | 7/2014 | Giuffrida | H04N 7/183 348/144 |

FOREIGN PATENT DOCUMENTS

| | | | | |
|---|---|---|---|---|
| CN | 103646384 | | 3/2014 | ............ G01C 11/00 |
| JP | 2003-83745 | | 3/2003 | ............ G01C 11/02 |

OTHER PUBLICATIONS

Haihua et al., "Integrated calibration of line-scan high spectral imaging system for agricultural products," Transactions of the Chinese Society of Agricultural Engineering, Issue No. 14, vol. 28, 2012, pp. 244-249 (translated abstract only) (6 pgs).

* cited by examiner

METHOD FOR OPTIMIZING FLIGHT SPEED OF REMOTELY-SENSED SCAN IMAGING PLATFORM

FIELD OF THE INVENTION

The present invention relates to the field of remote sensing detection technology, particularly to a method for optimizing flight speed of a remotely-sensed scan imaging platform.

BACKGROUND OF THE INVENTION

Remote sensing detection technology is a comprehensive technology, which applies various sensors to collect and process the information of electromagnetic wave radiated and reflected by remote targets according to the theory of electromagnetic waves, for finally imaging and thereby detecting and identifying the sceneries on the ground. By applying remote sensing technology, maps can be plotted at a high speed with high quality. The ways of remotely-sensed imaging include photographic imaging and scan imaging. The way of scan imaging requires the remotely-sensed scan platform to carry a remote sensing camera and fly over the imaging region at a constant relative speed. In order to prevent distortion of geometric dimensions of a target in a remotely-sensed scan image, the flight speed of the remotely-sensed imaging platform should be calibrated. The literature "integrated calibration method of agricultural product scanning and hyperspectral imaging system" (Transactions of the Chinese Society of Agricultural Engineering, Issue No. 14, Volume 28 of 2012, pages 244-249) discloses a method for calibrating scanning speed and correcting guide rail deviation, thus ensuring the accuracy of imaging data. This method adopts a specific corrector plate to correct the image collection system, whereas, during remotely-sensed scan imaging, the scanning speed cannot be calculated by a similar method.

For this reason, the present invention provides a method for optimizing flight speed of a remotely-sensed scan imaging platform to solve the foregoing problem.

SUMMARY OF THE INVENTION

The object of the present invention is to provide a method for optimizing flight speed of a remotely-sensed scan imaging platform, so as to realize high-precision remotely-sensed scan imaging of ground targets.

In order to solve the foregoing technical problem, the present invention adopts the following technical scheme:

A method for optimizing flight speed of a remotely-sensed scan imaging platform, characterized in that it includes the following steps:

Step 1: Selecting reference points: selecting point A and point B on the ground as reference points, wherein the distance between point A and point B is $L_{AB}$ km; selecting the central point of the connecting line of point A and point B as a reference point C; selecting point D as another reference point to make the connecting line CD of point D and point C perpendicular to the connecting line AB of point A and point B, and the distance between point D and point C be $L_{CD}$ km;

Step 2: Obtaining a remotely-sensed scan image in a reference point region, and processing data;

Step 3: Optimizing the flight speed of the remotely-sensed scan imaging platform.

"Step 2: Obtaining a remotely-sensed scan image in a reference point region, and processing data" further includes: using a remotely-sensed scan platform to carry a remote sensing camera to obtain the remotely-sensed images A', B', C' and D' of reference points A, B, C and D at a movement speed V; calculating the distance between A' and B' in the remotely-sensed images as $L_{A'B'}$ pixels, and the distance between C' and D' as $L_{C'D'}$ pixels.

"Step 3: Optimizing flight speed of the remotely-sensed scan imaging platform" further includes: calculating the optimized movement speed V' of the remotely-sensed scan platform by using the movement speed V of the remotely-sensed scan platform, distance $L_{A'B'}$ between A' and B' in the remotely-sensed images, distance $L_{C'D'}$ between C' and D', distance $L_{AB}$ between point A and point B and distance $L_{CD}$ between point D and point C. The calculation formula is $$V' = V \cdot \frac{L_{AB} \cdot L_{C'D'}}{L_{CD} \cdot L_{A'B'}}.$$

The present invention has the following beneficial effects: through optimizing the movement speed of the remotely-sensed mobile platform, the present invention can prevent the geometric dimensions of a target in a remotely-sensed scan image from being distorted so as to obtain a high-precision remotely-sensed image of ground target.

DETAILED DESCRIPTION OF THE EMBODIMENTS

Below the present invention will be described in details with reference to the accompanying drawings and specific embodiments, but these embodiments are not intended to limit the present invention. The structural, methodological or functional modifications made by those skilled in the art according to these embodiments fall within the scope of protection of the present invention.

Figure 1:
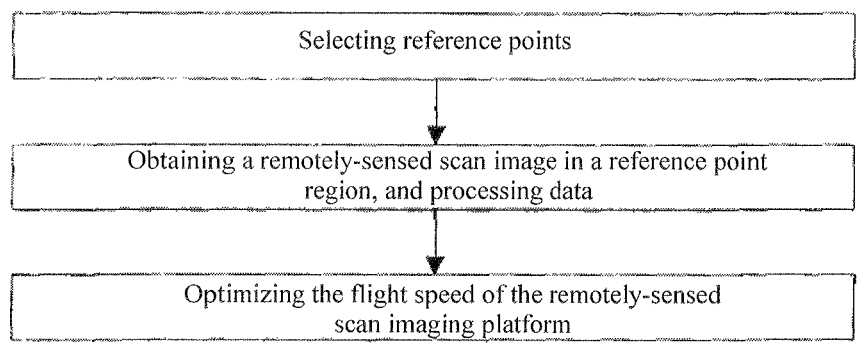
FIG. 1 is a flow diagram of the present invention.
Figure 2:
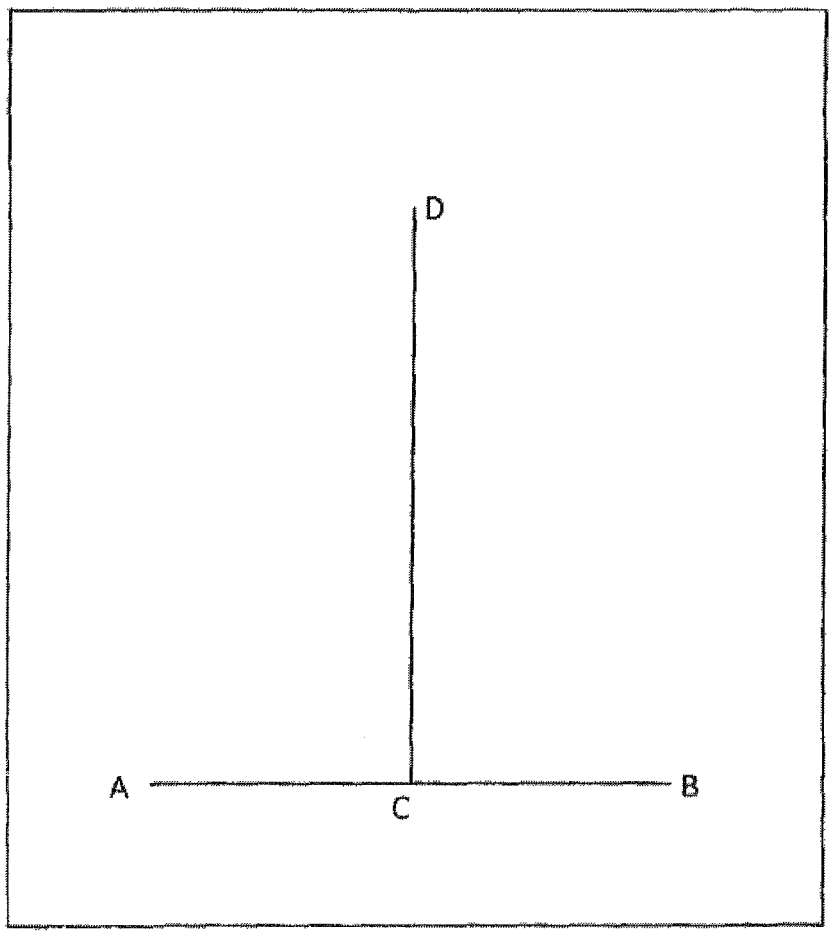
FIG. 2 is a schematic diagram of reference points A, B, C and D.
Figure 3:
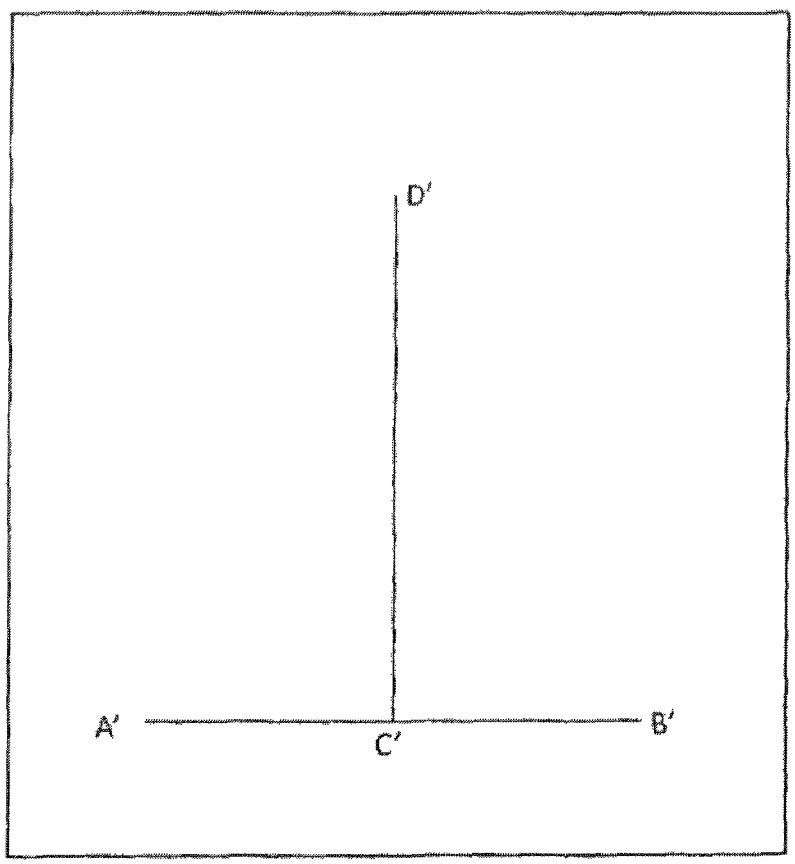
FIG. 3 is a schematic diagram of points A', B', C' and D' corresponding to reference points A, B, C and D in the remotely-sensed images.

As shown in FIG. 1, the method for optimizing flight speed of a remotely-sensed scan imaging platform includes the following steps:

Step 1: Selecting reference points;

Step 2: Obtaining a remotely-sensed scan image in a reference point region, and processing data;

Step 3: Optimizing the flight speed of the remotely-sensed scan imaging platform;

As shown in FIG. 2, "Step 1: Selecting reference points" is characterized by: selecting point A and point B on the ground as reference points, wherein the distance between point A and point B is $L_{AB}$=100 km; selecting the central point of the connecting line of point A and point B as a reference point C; selecting point D as another reference point to make the connecting line CD of point D and point C perpendicular to the connecting line AB of point A and point B, and the distance between point D and point C be $L_{CD}$=10000 km As shown in FIG. 3, "Step 2: Obtaining a remotely-sensed scan image in a reference point region, and processing data" is characterized by: using a remotely-sensed scan platform to carry a remote sensing camera to obtain the remotely-sensed images A', B', C' and D' of reference points A, B, C and D at a movement speed V=120 KM/H; and calculating the distance between A' and B' in the remotely-sensed images as $L_{A'B'}$=1200 pixels, and the distance between C' and D' as $L_{C'D'}$=114000 pixels.

"Step 3: Optimizing the flight speed of the remotely-sensed scan imaging platform" is characterized by: calculating the optimized movement speed V' of the remotely-sensed scan platform by using the movement speed V=120 KM/H, $L_{A'B'}$=1,200 pixels, $L_{C'D'}$=114,000 pixels, $L_{AB}$=100 KM, $L_{CD}$=10,000 KM according to the formula of $$V' = V \cdot \frac{L_{AB} \cdot L_{C'D'}}{L_{CD} \cdot L_{A'B'}} = 114 \text{ KM/H}.$$

The invention claimed is:

1. A method for optimizing flight speed of a remotely-sensed scan imaging platform, the method comprising:
    carrying the remotely-sensed scan imaging platform on at least one of an airborne vehicle and a satellite-borne vehicle, whereby the remotely-sensed scan imaging platform is positioned over a ground surface;
    selecting reference points on the ground surface by:
        selecting point A and point B on the ground surface as reference points,
    wherein a distance between point A and point B is $L_{AB}$ km;
        selecting the central point of a connecting line of point A and point B as a reference point C; and
        selecting point D as another reference point to make a connecting line CD of point D and point C perpendicular to the connecting line AB of point A and point B, and a distance between point D and point C be $L_{CD}$ km;
    obtaining, with an image sensor of the remotely-sensed scan imaging platform, a remotely-sensed scan image in a reference point region, and processing data;
    optimizing a flight speed of the remotely-sensed scan imaging platform.

2. The method for optimizing flight speed of a remotely-sensed scan imaging platform according to claim 1, wherein obtaining a remotely-sensed scan image in a reference point region, and processing data further includes: using a remotely-sensed scan platform to carry a remote sensing camera to obtain the remotely-sensed images A', B', C' and D' of reference points A, B, C and D at a movement speed V; and calculating the distance between A' and B' in the remotely-sensed images as $L_{A'B'}$ pixels, and the distance between C' and D' as $L_{C'D'}$ pixels.

3. The method for optimizing flight speed of a remotely-sensed scan imaging platform according to claim 1, wherein optimizing the flight speed of the remotely-sensed scan imaging platform further includes calculating an optimized movement speed V' of the remotely-sensed scan imaging platform by using a movement speed V of the remotely-sensed scan imaging platform, distance $L_{A'B'}$ between A' and B' in the remotely-sensed scan image, distance $L_{C'D'}$ between C' and D', distance $L_{AB}$ between point A and point B and distance $L_{CD}$ between point D and point C according to a formula of $$V' = V \cdot \frac{L_{AB} \cdot L_{C'D'}}{L_{CD} \cdot L_{A'B'}}.$$

* * * * *